March 31, 1964      L. E. MILLER      3,126,711
METHOD AND APPARATUS FOR TRANSFER OF CRYOGENIC LIQUID
Filed April 29, 1960
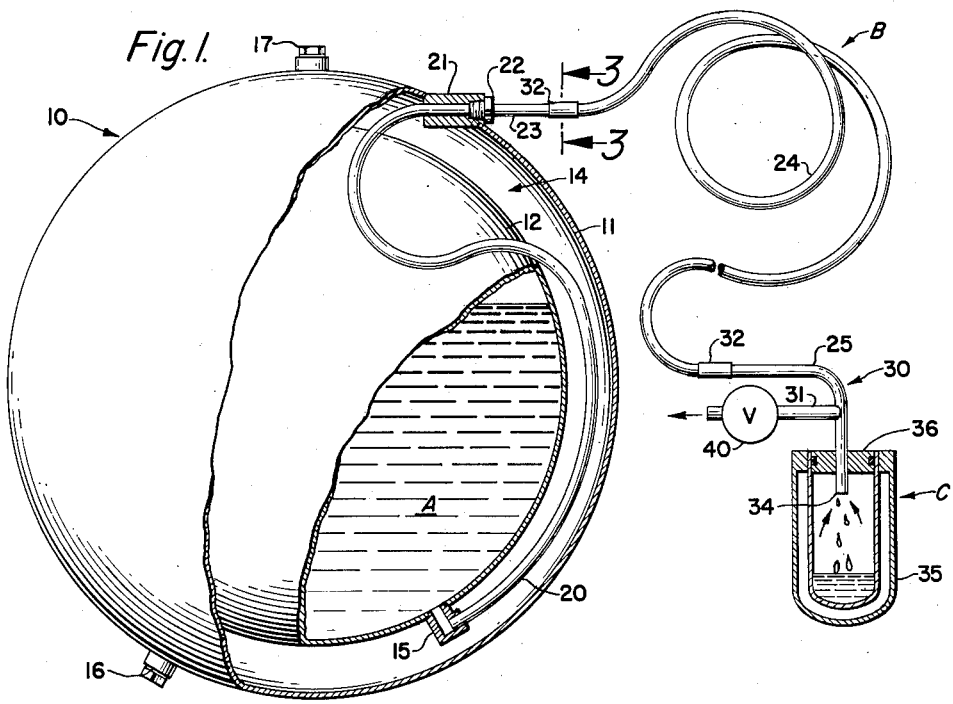
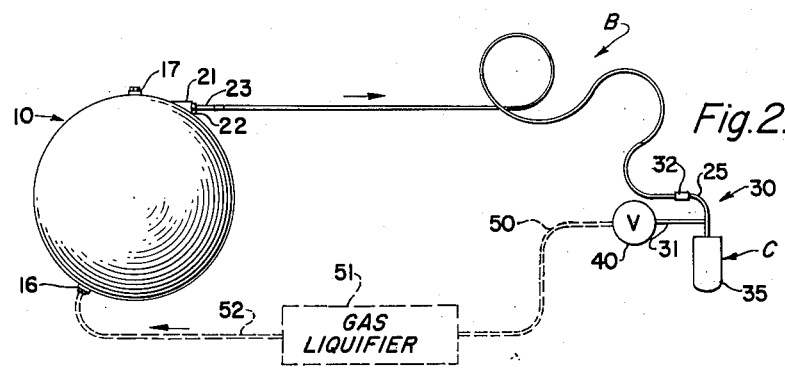
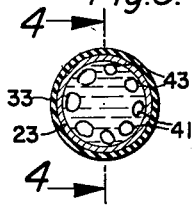
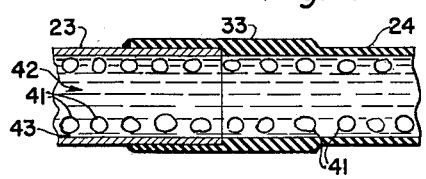
INVENTOR:
LAMON E. MILLER,
BY *William E. Martin*
Agent.

United States Patent Office 3,126,711
Patented Mar. 31, 1964

3,126,711
METHOD AND APPARATUS FOR TRANSFER OF CRYOGENIC LIQUID
Lamon E. Miller, Reseda, Calif., assignor to The Garrett Corporation, Los Angeles, Calif., a corporation of California
Filed Apr. 29, 1960, Ser. No. 25,700
4 Claims. (Cl. 62—52)

My invention relates to a method and means for transferring a highly volatile liquid from a source to a point of use under conditions of ambient temperature exceeding the boiling point of the liquid. More particularly it relates to a method and means whereby liquefied gases of the class commonly referred to as "cryogenic liquids" may be transferred at relatively low delivery rates and over relatively long distances from a source to a point of use through a single-walled or uninsulated transfer line operating in an environment where the ambient temperature exceeds the boiling point of the liquid.

Recent developments in the electronic arts, and especially in connection with what are known as solid-state and semi-conductor devices, have thrown increasing emphasis on the importance of refrigerating certain electrical, magnetic and electronic circuit components to extremely low temperatures as a means for inducing superconductivity therein, reducing thermal noise, or otherwise affecting or controlling the operating characteristics thereof. The temperatures of interest for such applications correspond roughly with the temperature range in which atmospheric gases may exist in the liquid state at normal atmospheric pressure, to wit, from about $-150°$ C. to the region of absolute zero, and are commonly referred to in the art as "cryogenic" temperatures.

The refrigeration of circuit components and other devices to these temperatures may be accomplished in the laboratory through a number of adequately effective means, which, because of size, complexity or expense, are not readily adaptable to use in commercial applications or in portable equipment. Where a switching device, amplifier or other circuit component must be operated at a temperature of, say, $-195°$ C., it may, for example, be immersed in a bath of liquid nitrogen. Where the period of operation is extended, however, a substantial quantity of the liquid nitrogen will be lost to evaporation and must be replenished either from a nearby nitrogen liquefying apparatus or from an adequate source of liquid nitrogen communicating with the immersion vessel through a suitably insulated line. Though such methods are adequate for many laboratory procedures, it will be apparent that they do not offer a practical or economical solution to the problem of cryogenic refrigeration in compact or portable equipment that is to be operated outside of a suitably equipped laboratory. While modern developments in compressor and heat exchanger technology make possible the design of relatively compact gas liquefiers, even the best of these is likely to exceed, by a substantial amount, the size, weight and cost of circuit elements or other devices which it may be desirable to refrigerate. Similarly, though efficient liquefied gas storage vessels of the vacuum insulated, double-wall type, commonly known as Dewars, are readily available, the insulated lines, valves, couplings and regulating devices needed to assure effective delivery of cryogenic liquid from such a vessel to a point of use for the contained liquid are generally cumbersome, expensive and far from trouble-free. Where the elements to be refrigerated are small, movably mounted, or necessarily remote from an appropriate source of liquefied gas, the difficulties associated with this type of refrigeration are such as to militate against its use in all but those circumstances where no alternate expedient will suffice. Thus, in the present state of the cryogenic art there exists a real and urgent need for a relatively compact, light-weight, inexpensive apparatus that may be safely used for small refrigerative loads in either fixed or portable equipment. As will be apparent from the following specification, the present invention affords a novel and versatile method and means to supply this need.

It is an object of the present invention to provide means for the transfer of cryogenic liquid from a storage vessel or source to a point of use under conditions where the ambient temperature exceeds the boiling point of the liquid.

It is another object of the invention to provide means for the transfer of cryogenic liquid through an uninsulated conduit.

It is another object of the invention to provide a method whereby a cryogenic refrigerant may be transferred from a source to a point of use through an uninsulated conduit under conditions of ambient temperature higher than the boiling point of the refrigerant.

It is another object of the invention to provide an uninsulated transfer line adaptable to use with a variety of cryogenic liquids.

It is another object of the invention to provide means for cryogenic refrigeration of movably mounted articles.

It is another object of the invention to provide a method for cryogenic refrigeration of small articles.

It is another object of the invention to provide a method for cryogenic refrigeration of movably mounted articles.

It is another object of the invention to provide a method whereby vapor evolved from a cryogenic liquid may be used to insulate the liquid as it is transferred from a source to a point of use.

It is another object of the invention to provide means for transporting a cryogenic liquid in an insulative envelope of its own vapor.

It is another object of the invention to provide a method for transporting a cryogenic liquid in which said liquid is divided into discrete droplets entrained in a thermally insulative stream of vapor.

It is another object of the invention to provide means for dividing a cryogenic liquid into discrete droplets and entraining the droplets in a stream of vapor formed by the liquid, thereby to convey the liquid from a source to a point of use.

Further objects of the invention will become apparent from the following description and the appended drawings.

In the drawings, which are merely illustrative of a preferred practice of the invention, and in which like members are designated by like reference numerals:

FIG. 1 is an elevation, partially broken away, showing the important elements of an open cycle refrigeration apparatus embodying the invention;

FIG. 2 is a diagram of an apparatus similar to that of FIG. 1, wherein dashed lines are used to indicate the manner in which the apparatus may be adapted to operation on a closed cycle;

FIG. 3 is a section taken along the line 3—3 of FIG. 1 illustrating the flow condition which prevails in a liquid transfer line according to the present invention; and FIG. 4 is a section taken along the line 4—4 of FIG. 3 showing a preferred construction for a portion of a liquid transfer line and further illustrating the flow condition therein.

Heretofore it has been the accepted practice in the transfer of liquefied gases to make use of insulated lines, generally of the coaxial type in which the liquid is conveyed through an inner conduit contained in a substantially coextensive outer housing so as to be entirely surrounded by an annular space which may either be vented to the vapor evolved by the liquid during transmission, as taught for example in U.S. Patents No. 625,759 to Hargrave and No. 2,871,670 to Huzel et al., or which may be highly evacuated so as to inhibit convective and conductive heat transfer to the liquid being transferred. Depending upon the characteristics of the cryogenic liquid itself, the ambient temperature conditions, the pumping means employed and the efficiency of the transfer line, a continuous, single-phase flow of liquid or a discontinuous, two-phase flow of liquid and gas may be achieved. From the point of view of transfer efficiency, of course, the single-phase, continuous flow condition is to be preferred, but where the required delivery rate is relatively low or the transmission line is long, sufficient transfer of ambient heat to the liquefied gas may take place to give rise to the two-phase flow condition.

Three characteristic types of two-phase flow of cryogenic liquids are generally recognized: a more or less uniform suspension of vapor bubbles entrained in the liquid; "slug" flow, in which a given region of the transfer line is alternately filled with pure liquid and pure gas; and annular flow, wherein the liquid adheres to the wall of the transfer line so as to surround a central core of vapor traveling at much higher speed than the liquid. In the present invention still a fourth type of two-phase flow, apparently distinct from the three previously recognized types, is used to provide transfer of cryogenic liquid at comparatively low delivery rates and over relatively long distances, for example 25 feet, through an uninsulated conduit which may be constructed of any suitable rigid or flexible material.

A singular characteristic of this unique flow condition, and one which materially augments the utility of the present invention, is that an uninsulated line in which such flow has been established exhibits no external formation of frost under ordinary atmospheric conditions, and may, in fact, be manipulated with bare hands in complete safety and comfort even when the temperature of the transferred liquid is, for example, as low as −320° F.

Referring to FIG. 1, an open cycle refrigeration apparatus according to the present invention and embodying the novel transfer line thereof is shown in elevation. A supply of cryogenic liquid A, for example liquefied nitrogen, is stored in an insulated vessel 10, preferably of the Dewar type having an outer wall 11, an inner wall 12 supported in spaced relation thereto by appropriate structural elements of minimal heat conductivity (not shown), and an intermediate space 14 which may preferably be evacuated so as to afford minimal heat transfer between the outer and inner walls 11 and 12. The enclosure formed by the inner wall 12 is provided with an outlet 15 communicating with a conduit 20 which emerges from the outer wall 11 at supply boss 21.

The conduit 20 may be of any desired form suitably connecting the outlet 15 with the supply boss 21, care being taken, however, to assure that the conduit provides minimal heat transfer between the outer wall 11 and inner wall 12; for the latter purpose a relatively long conduit of a material having comparatively poor heat conductivity is preferred. In a fully tested embodiment of the invention similar to that shown in the drawing, for example, a conduit of stainless steel having a length comparable with a great circle circumference of the inner wall 12 is curved into a self-supporting shape occupying a position substantially midway between the outer and inner walls 11 and 12.

Means for filling the vessel 10 with cryogenic liquid may be provided in the form of a second conduit (not shown) of essentially similar construction to the outlet conduit 20, and comunicating with an externally accessible charging port 16. Similarly, a vent line (not shown), also of similar construction to the outlet line 20 and communicating with an external vent port 17, may be provided to accommodate means for maintaining the pressure inside the storage vessel at a desired value.

The supply boss 21 is preferably provided with a suitable fitting 22 which may, for example, be of a conventional threaded nipple type, for the attachment thereto of a liquid transfer line, generally designated by the letter B. For reasons that will be made apparent hereinafter, the supply boss 21 should be constructed so as to make good thermal contact with the outer wall 11, the conduit 20 and the liquid delivered to the transfer line B, any of the conventional techniques of welding, brazing, soldering, threading or the like, when applied with ordinary skill to the respective structural elements, being adequate for this purpose.

The transfer line B includes an inlet pipe 23 coupled to the supply boss 21 by means of the fitting 22; an intermediate portion 24 of appropriate length for the liquid transfer operation to be performed; and a delivery portion or outlet pipe 25 located in the region of the point of use of the transferred liquid and preferably including a flow deflection means 30 and a vent 31, the purpose of which will be more fully described hereinafter. In the embodiment shown in the drawing, the intermediate portion 24 may be of flexible or resilient material, for example, rubber or a synthetic elastomer, or a plastic, so as to be adaptable to use under conditions where the storage vessel 10 and the point of use, generally designated by the letter C, may be movable relative to each other. As the refrigeration apparatus shown is operable at an internal pressure only slightly higher than that of the ambient atmosphere, the intermediate portion 24 of the transfer line B may be joined to the inlet pipe 23 and the delivery pipe 25 by joints 32 which may, for example, be made by forcing a short length of each of the rigid pipes 23 and 25 into the interior of the resilient portion 24. For reasons that will appear hereinafter, however, a preferable form of joint may be made by cementing or vulcanizing the mating ends of the respective portions 23, 24 and 25 of the transfer line B, as shown in section in FIG. 4, so as to afford a smooth interior surface offering minimal disturbance to fluid flow, the structural strength of the joint being preferably augmented by a sleeve 33 externally engaging the rigid portion of the line. The sleeve 33 may be formed integrally with the resilient portion 24, as shown, and bonded in place on the mating rigid portion or, if preferred for reasons of easy disassembly, it may be slipped over the joint and held in place by appropriate clamping means (not shown). Though in the embodiment shown and described, the intermediate portion 24 is of flexible or resilient material, thereby to accommodate relative movement between the supply of cryogenic liquid and the point of use thereof, it is to be understood that the invention is not limited to such a construction and that the intermediate portion 24 of the transfer line B may, if desired, be of rigid material and may, further, be of unitary or integral construction with the inlet portion 23 and the terminal portion 25. It is anticipated, of course, that those skilled in the art will have opportunity to practice numerous other variations on the particular construction illustrated and described without departing from the spirit and scope of the invention.

The delivery pipe 25 of the transfer line B is provided with an outlet 34 whereby the cryogenic liquid is introduced to the space to be refrigerated, designated in the drawing by the letter C and, in the embodiment shown, enclosed by a double-walled insulated vessel or Dewar 35. The entry of the delivery pipe 25 into the Dewar 35 is preferably sealed against communication with the ambient atmosphere by a closure 36 which may, for example, be a frictionally retained, removable stopper as shown in the drawing or, where design considerations and economies so indicate, may be formed integrally with the vessel 35 and the terminal portion 25 of the transfer line.

As will be readily apparent to those skilled in the art, in order to induce either a gaseous or a liquid flow from the supply of liquid A, through the transfer line B, to the point of use C, a pressure difference of appropriate sense and magnitude must be established between the supply A and the point of use C. This may be accomplished by applying a pressure slightly greater than that of the ambient atmosphere, say 1 to 2 p.s.i.g., to the liquid supply A, and venting the transfer line B to the atmosphere through the vent 31 incorporated in the delivery pipe 25. The required pressure may be established by vaporizing a portion of the stored liquid in an auxiliary heat exchanger (not shown) which may, for example, utilize ambient heat stored in the outer wall 11, and returning the vapor thus evolved to the space above the liquid surface in the vessel 10; in order to maintain the resulting pressure at a relatively constant value, thereby to assure a uniform rate of liquid delivery at the supply boss 21, a pressure relief valve (not shown) may be provided, such valve being arranged to discharge a portion of the vapor in vessel 10 to the surrounding atmosphere when the pressure in vessel 10 exceeds a desired value. In applications where it is desirable that delivery of liquid to the point of use C be started or stopped some time after the storage vessel 10 has been charged and pressureized, such control may be achieved by means of a valve 40, operable to open or close the vent 31. As the establishment of flow through the transfer line B depends on the pressure difference between the storage vessel 10 and the outlet 34, it is apparent that by closing the valve 40 this pressure difference may be reduced to zero so as to prevent further flow until such time as the valve is again opened. The valve 40 may, of course, be of any type suitable for use with low pressure gases and may be manually or remotely controlled.

Referring now to the preceding description and to the accompanying drawings, the operation of a refrigeration apparatus according to the present invention will be particularly described. As noted in the foregoing discussion, the cryogenic liquid stored in the vessel 10, which for exemplary purposes may be assumed to be liquid nitrogen ($N_2$) having a temperature at normal atmospheric pressure of approximately $-195°$ C., is urged through the outlet 15 and the conduit 20 toward the supply boss 21 under the influence of the pressure confined in the inner portion of the vessel 10. The supply boss 21, being in good thermal contact with the outer wall 11, is maintained substantially at the ambient temperature and constitutes a high capacity heat source capable of rapidly vaporizing a portion of the liquid nitrogen emerging from the conduit 20. The supply boss and the outer wall 11 of the vessel 10 therefore perform the function of a heat exchanger, drawing heat from the ambient atmosphere and transferring this heat to the liquid nitrogen which passes from the conduit 20 to the inlet pipe 23 of the transfer line B. The effect of this heat transfer is to suddenly vaporize, or flash, a portion of the liquid nitrogen so as to introduce a two-phase mixture of liquid and gaseous nitrogen into the inlet pipe 23. Qualitative observation with the aid of a transparent-walled transfer line reveals that the resulting two-phase flow does not, however, conform to the recognized characteristics of any of the three types of two-phase cryogenic flow previously described. Rather, as shown in FIGS. 3 and 4, the flow appears to consist of a suspension of discrete liquid droplets 41 entrained in a gaseous stream 42, the volume of the gas, or vapor, being several times greater than that of the liquid. The droplets 41 do not appear to wet the interior wall of the transfer line, but rather to be narrowly separated therefrom by a film of vapor 43.

Since the effectiveness of the transfer line appears to depend largely on the preservation of this film, it is desirable that the interior surface of the line be as smooth and uniform as possible, thereby to favor the maintenance of laminar flow in the gaseous or vapor phase of the fluid confined therein, and that care be taken to avoid any irregularities or abrupt changes in section such as might tend to induce or aggravate turbulent flow. In a transfer line having joints 32 formed by merely inserting one member into another without provision for securing a smooth or continuous interior surface, for example, it has been observed that substantial heat leakage prejudicial to the over-all effectiveness of the transfer line is locally concentrated in the region of the joints.

As the temperature of the vapor or gaseous portion of the flow, in consequence of heat transfer through the wall of the uninsulated transfer line, is substantially higher than that of the liquid portion, it is desirable to separate the two phases of the fluid mixture so as to assure that only the colder liquid phase is delivered to the point of use, thereby to achieve maximal refrigerative efficiency. In the present invention this is accomplished by means of the vent 31 in the delivery pipe 25, through which the vapor is released to a pressure lower than that which prevails in the transfer line B and the receiving vessel C. The separation of the liquid and vapor phases is further augmented by the elbow or flow deflection means 30; as the two-phase flow traverses the bend formed by this elbow the greater density of the fluid in the liquid phase causes it to be urged by centrifugal force toward the outer radius of the bend, thus tending to assure that no liquid will be entrained in the vapor escaping from the vent 31, which is preferably located, as shown in the drawings, in a portion of the delivery pipe substantially tangent to the inner radius of the bend. It has been additionally found that more efficient separation of the gaseous and liquid phases may be achieved through the use of a delivery pipe 25 having a slightly greater internal diameter than the intermediate portion of the transfer line 24, the increased diameter being effective to reduce the gaseous flow velocity and increase the static pressure differential effective at the vent. Further, as the internal pressure in the receiving vessel C is substantially equal to that in the delivery pipe 25, it will be apparent that the flow of liquid from the delivery pipe to the point of use must be dependent on the linear momentum acquired by the liquid droplets in consequence of their velocity and inertia, and for this reason it is desirable that the vent 31 be positioned relatively close to the delivery pipe outlet 34 and that there be no intermediate obstructions such as might trap or impede the flow of liquid between the vent 31 and the receiving vessel.

In summary, the basic operating cycle of a liquid transfer system according to the present invention includes the successive steps of withdrawing the liquid from a storage vessel or source by means of a differential pressure; heating the liquid thus withdrawn sufficiently to convert a portion of it to vapor entraining discrete droplets of unvaporized liquid; conveying the two-phase mixture of vapor and liquid via an enclosed flow path or conduit toward the point of use; separating the liquid from the vapor phase of the mixture by means of the inertia of the former, and venting the latter to a pressure lower than the pressure of the source.

It will be apparent from the foregoing description that the refrigeration apparatus illustrated in FIG. 1 is capable of numerous variations embodying the essential principles of the invention. For example, where prolonged operation or economy of cryogenic material is an important consideration, the open cycle in which vapor is vented to the atmosphere, as shown in FIG. 1, may be converted to a closed cycle in which the vaporized portion of the cryogenic liquid is reliquefied and returned to the storage vessel. In FIG. 2, in which the additional elements necessary for closed cycle operation are schematically indicated by the dashed lines, 50 is a passage connecting the outlet port of the valve 40 with the inlet of a gas liquefying apparatus 51, which may be any one of the several types well known in the art and amply described in the literature pertaining thereto, the reliquefied refrigerant produced thereby being delivered to the storage vessel 10 via a return passage 52.

Further, it is anticipated that in some practices of the invention, where the ambient atmospheric heat transferred to the supply boss 21 may be insufficient or too variable to assure adequate vaporization of the liquid therein, a supplementary heat source may be incorporated therewith. For example, where a refrigerating apparatus of the type described is required to operate in a temperature environment which may vary between, say +165° F. and −65° F., and the refrigerant used is, say, Freon 13 ($CF_3Cl$) whose boiling point is −112° F., it may occur that at the lower limit of ambient temperature insufficient heat will be available at the supply boss 21 to provide the degree of vaporization needed to sustain the desired two-phase flow of vapor-entrained droplets. Where such is the case, one of the alternate types of two-phase flow, in which the liquid phase makes actual contact with the wall of the transfer line, may become established, with the possible result, rendered more probable the greater the length of the transfer line, that heat absorbed through the wall of the intermediate portion of the transfer line 24 will be sufficient to progressively vaporize all of the cryogenic fluid before it can be delivered to the point of use. The choice of an alternate refrigerant having a boiling point temperature sufficiently below the lowest anticipated ambient temperature to assure adequate vaporization at the supply boss to sustain the desired type of two-phase flow would offer one possible solution to this difficulty; where the temperature to be maintained at the point of use or some other criterion demands the use of a specific cryogen, however, the difficulty may be overcome through the inclusion of a supplementary heat source in association with the supply boss 21. For example, in a case of the type cited wherein small quantities of liquid Freon 13 are to be delivered through a long transfer line at an ambient temperature of −65° F., an electrical heating element, which may be controllable in accordance with the ambient temperature, may be placed in heat transfer relation with the supply boss 21, or alternately, if the vapor withdrawn from the vent 31 is to be reliquefied and returned to the storage vessel, an appropriate heat exchange element may be provided whereby the heat generated in a portion of the liquefaction cycle may be transferred to the supply boss or inlet portion of the transfer line in sufficient quantity to sustain the desired rate of vaporization of the liquid therein.

From the foregoing specification it will be apparent that the present invention provides a novel means and method whereby a cryogenic liquid may be transported, over relatively long distances and under conditions of ambient temperature exceeding the boiling point of the liquid, through an uninsulated line at a substantially lower delivery rate and greater efficiency than would otherwise be possible. It will be further apparent that the means and method described are adaptable to use with a variety of refrigerating systems and apparatus a swell as with a corresponding variety of cryogenic liquids. An additional advantage conferred by the invention, and one of importance in many phases of cryogenic practice, is the provision of an uninsulated transfer line which may be flexible, which will remain frost-free under ordinary atmospheric conditions, and which may be manipulated both safely and comfortably with bare hands.

It is to be understood that the foregoing specification and appended drawings, descriptive of a preferred practice of the invention, are presented for exemplary and illustrative purposes only and are not to be taken by way of limitation. It is anticipated that those skilled in the art will have opportunity to practice numerous variations on the invention as herein disclosed, and it is intended that all such variations falling within the spirit and scope of the invention be secured to me by United States Letters Patent.

I claim:
1. A cryogenic liquid transfer system comprising:
a cryogenic liquid storage vessel including an internal storage space to contain a body of cryogenic liquid and an outer wall surrounding said space;
a receiver to receive cryogenic liquid from said space;
a liquid transfer line extending from said storage space, through said outer wall, to said receiver and defining a passage for communicating said receiver to a body of liquid in said space, whereby liquid is adapted to flow from said space through said transfer line;
said transfer line including a relatively short, massive, thermally conductive body substantially larger in diameter than the transfer line surrounding and disposed in efficient heat transfer relation to said passage where said transfer line emerges from said container through said wall;
said body comprising a material having high thermal conductivity and being exposed externally of said vessel for receiving heat from an external source at a temperature higher than the boiling point of said liquid, whereby as the liquid expelled from said storage space through said passage passes through said body, it flashes to a vapor containing entrained droplets of liquid; and
means at said receiver for exhausting vapor from said passage and effecting movement of said droplets to said receiver.

2. The subject matter of claim 1 wherein:
said body comprises a metal supply boss mounted directly on said container wall; and
said transfer line comprises a first section of transfer line extending from said space to said boss, a second section of transfer line extending from said boss to said receiver, and a releasable coupling between said second section and said boss.

3. A liquid transfer system comprising:
a liquid transfer line defining a liquid transfer passage;
means connected to one end of said line for delivering a liquid under pressure to the adjacent end of said passage;
means adjacent said one end of said transfer line for heating said liquid to flash the latter to a vapor containing entrained droplets of liquid;
a liquid receiver connected to the other end of said line having a chamber communicating to the adjacent end of said passage for receiving said droplets; and
a vent line extending transversely from said transfer line immediately upstream of said receiver and communicating with a pressure less than the vapor pressure in said transfer line, whereby vapor is vented from said passage through said vent line while the momentum of said droplets carries the later past said vent line into said receiver.

4. A liquid transfer system comprising:
a liquid transfer line defining a liquid transfer passage;
means connected to one end of said line for delivering a liquid under pressure to the adjacent end of said passage;
means adjacent said one end of said transfer line for heating said liquid to flash the latter to a vapor containing entrained droplets of liquid;
a liquid receiver connected to the other end of said line having a chamber communicating to the adjacent end of said passage for receiving said droplets;
said transfer line having a bend of relatively small radius immediately upstream of said receiver whereby centrifugal force urges said droplets outwardly toward the outer radius of said bend as the particles travel around the bend; and
a vent line extending from the inside of said bend toward the center of curvature thereof, and communicating with a pressure less than the vapor pressure in said transfer line, whereby vapor is vented from said passage through said vent line while centrifugal force and the momentum of said droplets carry the latter past said vent line into said receiver.

References Cited in the file of this patent

UNITED STATES PATENTS

| | | |
|---|---|---|
| 2,364,783 | Goddard et al. | Dec. 12, 1944 |
| 2,489,680 | Shoemaker et al. | Nov. 29, 1949 |
| 2,604,761 | Atchison | July 27, 1952 |
| 2,609,282 | Haug et al. | Sept. 2, 1952 |
| 2,871,670 | Huzel et al. | Feb. 3, 1959 |
| 2,895,305 | Reed | July 21, 1959 |
| 2,996,893 | Goodenough et al. | Aug. 22, 1961 |

OTHER REFERENCES

Advances in Cryogenic Engineering, volume 6, Timmerhaus, published by Plenum Press, Incorporated, New York, 1961, pages 354–355 relied on.